United States Patent
Bostick et al.

(10) Patent No.: US 10,169,842 B2
(45) Date of Patent: Jan. 1, 2019

(54) DYNAMIC CONTENT ADJUSTMENT ON A BENDABLE TRANSPARENT DISPLAY

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 14/791,723

(22) Filed: Jul. 6, 2015

(65) Prior Publication Data

US 2017/0010689 A1   Jan. 12, 2017

(51) Int. Cl.
| | |
|---|---|
| *G06F 3/0346* | (2013.01) |
| *G06T 3/40* | (2006.01) |
| *G06F 1/16* | (2006.01) |
| *H04M 1/725* | (2006.01) |
| *H04M 1/02* | (2006.01) |

(52) U.S. Cl.
CPC .............. *G06T 3/40* (2013.01); *G06F 1/1652* (2013.01); *H04M 1/72569* (2013.01); *H04M 1/0268* (2013.01)

(58) Field of Classification Search
None
See application file for complete search history.

(56) References Cited

U.S. PATENT DOCUMENTS

| | | | |
|---|---|---|---|
| 6,340,957 B1 | 1/2002 | Adler et al. | |
| 2010/0060548 A1* | 3/2010 | Choi | G06F 3/0414 345/1.3 |
| 2011/0134087 A1 | 6/2011 | Moriwaki | |
| 2011/0134144 A1* | 6/2011 | Moriwaki | G09G 3/3208 345/660 |
| 2014/0098095 A1* | 4/2014 | Lee | G06F 3/041 345/420 |
| 2014/0101560 A1 | 4/2014 | Kwak et al. | |

(Continued)

FOREIGN PATENT DOCUMENTS

| | | |
|---|---|---|
| EP | 2575033 A1 | 4/2013 |
| WO | 2015015048 A1 | 2/2015 |

OTHER PUBLICATIONS

Strasser, Erich; "Samsung Display show future flexible-transparent OLED-Display devises"; Nov. 5, 2012; <https://www.youtube.com/watch?v=upfoc4lrblo>.

(Continued)

*Primary Examiner* — Christopher R Lamb
(74) *Attorney, Agent, or Firm* — Walter L. Rudberg; Maeve M. Carpenter

(57) ABSTRACT

Embodiments of the present invention provide a method and system for adjusting content on a transparent display. The method includes receiving data associated with one or more bends in a transparent bendable display. The display includes content, however the one or more bends in the display creates a visual obstacle the display to a user. The one or more processors calculate an effective display in response to receiving a plurality of data associated with one or more bends in the display. The content is adjusted to fit in the effective display.

18 Claims, 4 Drawing Sheets

(56) References Cited

U.S. PATENT DOCUMENTS

| | | | | |
|---|---|---|---|---|
| 2014/0118317 A1* | 5/2014 | Song | ................ | G06F 1/1652 |
| | | | | 345/204 |
| 2014/0306985 A1* | 10/2014 | Jeong | ................ | G09G 3/3233 |
| | | | | 345/601 |
| 2015/0138184 A1* | 5/2015 | Bilbrey | ............. | H04N 13/0022 |
| | | | | 345/419 |

OTHER PUBLICATIONS

"Method and System for Evaluating Confidentiality of Content to be Displayed on Different Areas of Transparent Flexible Display Devices"; An IP.com Prior Art Database Technical Disclosure; IP.com No. 000239673; Nov. 24, 2014; pp. 1-5.

"OLED"; Wikipedia, the free encyclopedia; last modified Mar. 20, 2015; pp. 1-27; <http://en.wikipedia.org/wiki/OLED>.

"See-through display"; Wikipedia, the free encyclopedia; last modified Aug. 30, 2014; pp. 1-3; <http://en.wikipedia.org/wiki/See-through_display>.

U.S. Appl. No. 14/621,911, filed Feb. 13, 2015; Entitled "Dynamic Content Alignment in Touch Screen Device"; pp. 1-34.

* cited by examiner

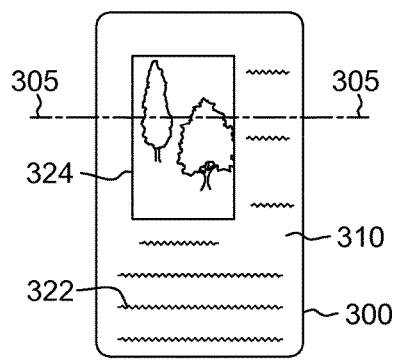
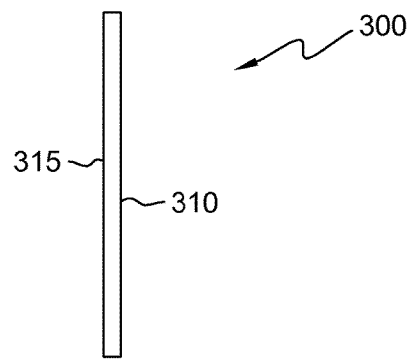
FIG. 3A  FIG. 3B
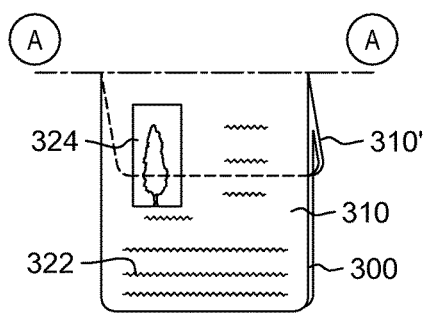
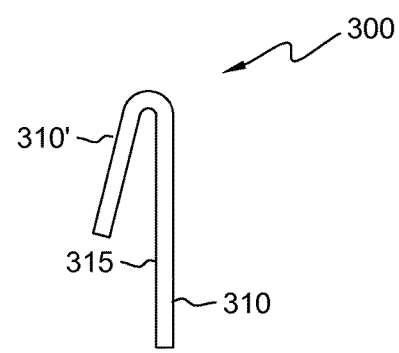
FIG. 3C  FIG. 3D
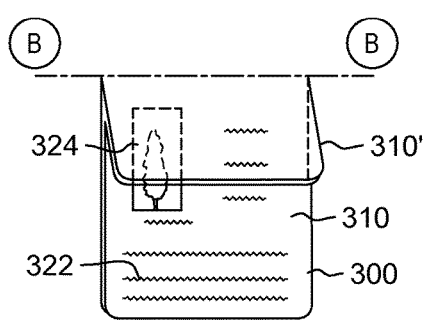
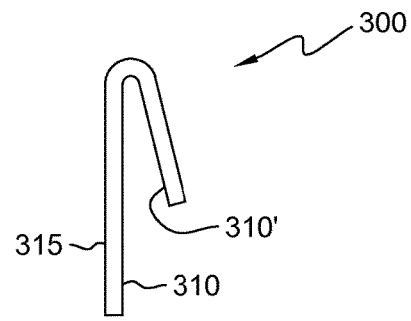
FIG. 3E  FIG. 3F

DYNAMIC CONTENT ADJUSTMENT ON A BENDABLE TRANSPARENT DISPLAY

BACKGROUND OF THE INVENTION

The present invention relates generally to the field of displaying content, and more particularly to adjusting content on a transparent and flexible display.

Transparent and flexible display screens are becoming more widespread. Many devices such as laptops, tablets, portable gaming consoles, TV's and mobile phones are utilizing such display screens. Devices which utilize a transparent display provide a user with the ability to view content on the display surface while maintaining the ability to see through the display as well. Further transparent and flexible displays allow a user to (1) bend and fold a display screen at different locations as well as (2) allow the user to see what is on the display screen while still being able to see through the screen. Bending a transparent and flexible display screen may make the information displayed on such device difficult to comprehend when there are multiple layers of content displayed on the screen.

SUMMARY

According to one embodiment of the present invention, a method for adjusting content on a transparent display, the method comprising: receiving, by one or more processors, a first set of data associated with one or more bends in a display, wherein the display includes content, wherein the one or more bends in the display creates a visual obstacle the display to a user; in response to receiving a plurality of data associated with one or more bends in a display, calculating, by one or more processors, an effective display; and adjusting, by one or more processors, the content to fit the effective display.

Another embodiment of the present invention provides a computer program product for adjusting content on a transparent display, based on the method described above.

Another embodiment of the present invention provides a computer system for adjusting content on a transparent display, based on the method described above.

BRIEF DESCRIPTION OF THE DRAWINGS

FIGS. 3A-F depict the plan and cross-sectional views of a transparent flexible display, displaying an example of a graphic image and accompanying text, in accordance with an embodiment of the present invention.

DETAILED DESCRIPTION

Transparent display devices allow a user to see what is shown on the display screen while still being able to see through the screen. Flexible display screens allow a user to bend and fold the display screen. Flexible displays allow a user to bend and fold a device display, which may create multiple layers of a single display, thereby causing the user difficulty in reading the material displayed on such a device.

A transparent flexible display may be implemented with devices, such as a mobile phone, a smartphone, a portable multimedia player, a personal digital assistant (PDA), a tablet PC, a navigation system, or wearable technology, such as a smart watch. Similarly, a transparent flexible display may be implemented with a stationary display device, such as a monitor, TV, or a kiosk display.

A transparent flexible display has a flexible transparent structure such that the display is comprised of elements of a transparent flexible material. For example, when the substrate is made of a polymer material such as a plastic having a transparent nature, coupled with a transparent organic light emitting substance, the display will have a transparent flexible appearance.

The transparent flexible display is bendable and can be deformed by an external applied force. The display can be manipulated into various shapes like paper. For example, a flexible display can be folded on top of itself, bent, crooked, twisted, rolled like a scroll, and the like, all while maintaining display characteristics.

Figure 1:
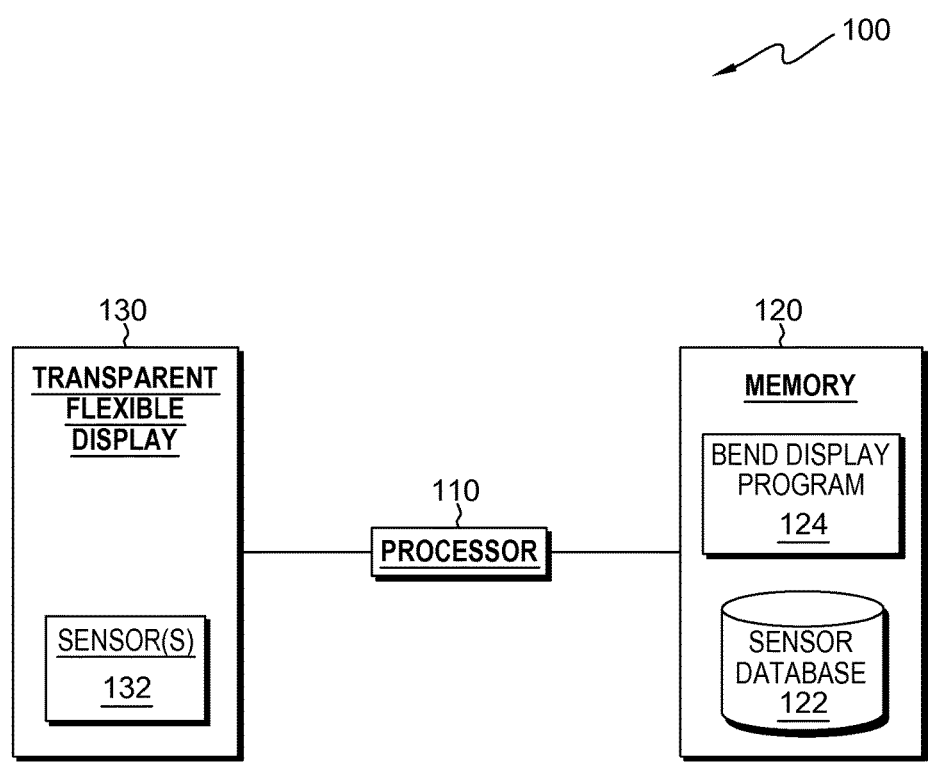
FIG. 1 is a functional block diagram of a computing device, in accordance with an embodiment of the present invention.

The present invention will now be described in detail with reference to the Figures. FIG. 1 depicts a functional block diagram illustrating a computing device, generally designated 100, in accordance with an embodiment of the present invention. Modifications to computing device 100 may be made by those skilled in the art without departing from the scope of the invention as recited by the claims. In an exemplary embodiment, computing device 100 includes one or more processor(s) 110, memory 120, and transparent flexible display 130 (hereinafter referred to as display 130). Computing device 100 may be any electronic device capable of being implemented with a transparent flexible display, including, but not limited to, personal data organizers, handheld gaming platforms, cameras, mobile devices, and tablets.

Memory 120 includes sensor database 122 and bend display program 124. Memory 120 may include any suitable volatile or non-volatile computer readable storage media, and may include random access memory (RAM) and cache memory (not depicted in FIG. 1). Bend display program 124 may be stored in a persistent storage component (not depicted) for execution and/or access by one or more of processor(s) 110 via one or more memories of memory 120. Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information.

Sensor database 122 is a repository for data received from sensors 132. Sensor database 122 stores the received sensor data from a bend in a device display, including display bend lines, bend radii, bend angles, bend durations, and bend frequencies, as well as, the pre-determined device bending thresholds.

Bend display program 124 uses sensor data from either sensor database 122 or sensors 132 themselves, and dynamically adjusts the content on a display for a user to enhance a user's ability to read and comprehend the material and content displayed on a display 130. Bend display program 124 analyzes sensor data and extrapolates the data to determine the appropriate adjustment of content on display 130. Specifically, bend display program 124 receives data about a bend in a display, and analyses the data and adjusts the screen content accordingly for the best visibility to the user. Bend display program 124 evaluates a bend in display 130 to determine if any part of the screen covers itself, how much of the screen has an overlap, as well as, the direction of the bend that overlaps a portion of the screen. If any portion of the display is covered, bend display program 124 calculates the new effective display screen and accordingly adjusts the displayed content to fit the content on the display. Bend display program 124 may change the transparency of display 130 to opaque or fully transparent dependent on the direction of a bend of display 130. Additionally, bend display program 124 may also produce a refraction factor, thereby counteracting any refraction caused by an overlap of display 130 on itself.

Display 130 includes sensors 132. Display 130 is capable of displaying images (such as a still image or a moving image) generated by a computing device. Display 130 may be a display including a flexible substrate. For example, display 130 may be composed of any suitable flexible display, such as an organic light-emitting diode (OLED) display. The flexible characteristic allows for a free curving movement of display 130. Display 130 may include a flexible substrate, which can be transparent. Display 130 may include touch-sensing capabilities. The content displayed on display 130 can include, but is not limited to: text, images, and videos. Additionally, properties of display 130 can vary between different devices, based on the size, shape, curvature, bendability, foldability and the like. In an exemplary embodiment, display 130 is entirely flexible. In an alternative embodiment, display 130 is bendable in only certain directions. In an alternative embodiment display 130 comprises at least one bendable display region and at least one non-bendable display region. In an exemplary embodiment, display 130 is entirely transparent.

Sensors 132 are installed in the registers (not depicted in FIG. 1) of display 130 and are configured to detect a curved state of display 130. Sensors 132 detect information about where the display is bent including: the direction, the bending, and radius, among other information. Sensors 132 may be any sensor technology known in the art with the ability to detect any bend and corresponding information in the display screen, such as pressure sensors, accelerometers, strain gauges, and the like.

Figure 2:
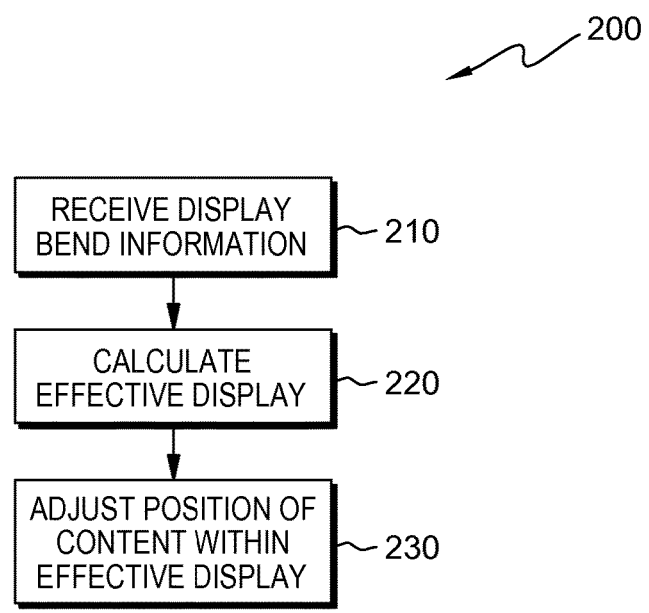
FIG. 2 is a flowchart illustrating operational steps for determining and adjusting content on a transparent and flexible display screen, in accordance with an embodiment of the present invention.

FIG. 2 depicts flowchart 200 illustrating operational steps of bend display program 124 for determining and adjusting content on a transparent and flexible display screen, in accordance with an embodiment of the present invention.

In step 210, bend display program 124 receives, from sensors 132, the sensor data associated with a bend in Display 130. In an exemplary embodiment sensors 132 detect and measure movement of a bend in display 130. Sensors 132 measurements include, but are not limited to, direction, bend lines, bend radii, bend angles, and location. Bend display program 124 receives measurement data from sensors 132 in response to a bend in the display. In an alternative embodiment, sensors 132 send measurement data to sensor database 122 which is accessible by bend display program 124.

In step 220, bend display program 124 analyses and calculates the effective display based in part on sensors 132 measurement data. The effective display is the portion of display 130 viewable to a user. The size, shape and position of the effective display area may change based on the deformation in display 130 caused by an external applied force. The effective display may relate to the non-overlapping area of the display. Alternatively, the effective display may relate to the display area viewable to the user which may including both the overlapping and non-overlapping portions of the display. In an exemplary embodiment, bend display program 124 analyzes and calculates stress points in the display and derives a bending line. Once a bending line is derived, bend display program 124 determines the bent portion of display 130 and the corresponding dimension. Bend display program 124 also determines the direction of the bend, for example, whether the fold in the display is folded over or below the display. Additionally, bend display program 124 determines if the bent portion covers a portion of display 130. Thereby, based in part on sensor data, bend display program 124 calculates the effective display. In an alternative embodiment, based on sensor data, bend display program 124 calculates the bent portion of display 130, then deducts the area of the bent portion from the entire display, resulting in the effective display. In alternative embodiments, bend display program 124 receives a pre-derived bent portion of display 130 and the corresponding dimensions along with the direction of the bend.

In step 230, bend display program 124 adjusts the content within the effective display, if necessary. In an exemplary embodiment, content may be realigned on the transparent flexible display, based upon a detected bend in the display, if the bend obstructs or covers a portion of display 130. In an exemplary embodiment, content may be re-aligned, shifted, and/or adjusted on display 130, adapting to the bend or curvature of the device to enable easy review of the material shown on the display. Bend display program 124 analyzes the current information and content depicted on display 130, including, but not limited to, font, alignment, and images. Additionally, bend display program 124 re-arranges the content within the effective viewing area of display 130 by comparing the content to be displayed, as if there is no bend in display 130, with the new effective display. To accommodate the new effective viewing area of display 130, bend display program 124 may reduce and/or realign any text, images, video, etc. Additionally, in other embodiments a portion of display 130 may turn transparent or opaque dependent on the direction of the bend on display 130. For example, if display 130 is folded on top of itself, display 130 may turn transparent allowing the user to fully review all the content displayed in display 130. In this example, the top layer of the transparent display becomes clear, the bottom layer contains the substance disabled, and all the content is re-arranged in order to fit comfortably on display 130. In an alternative embodiment of the aforementioned example, when the top layer of the transparent display becomes clear, a refraction factor may be utilized. The refraction factor removes any light refraction obscuring the displayed content, thereby aligning the content depicted on display of any misalignment caused by a refraction between the display itself and the covered section of the display. In another example, if display 130 is folded behind itself, display 130 may turn opaque allowing the user easier readability of all the content displayed in display 130. In this example, the top layer of the transparent display contains the content displayed, the bottom layer becomes opaque, and all the content is re-arranged in order to fit on display 130. The opaque bottom layer becomes a solid background allowing the top layer of display to be readable.

Accordingly, by preforming the operational steps of flowchart 200, a flexible display is dynamically adjusted responsive to a bend in the display, reducing the difficulty in reading the material displayed on the transparent flexible display device.

FIGS. 3A-F depict the plan and cross-sectional views of a transparent flexible display device 300 (referred to hereinafter as device 300), displaying an example of a graphic image and accompanying text, in accordance with an embodiment of the present invention. Specifically, FIGS. 3A and 3B depict a plan view and cross-sectional view, respectively of an example of a transparent flexible device that is not bent. FIGS. 3C and 3D depict a plan and cross-sectional view, respectively of an example of a transparent flexible device where the top portion of the screen is folded behind the screen. FIGS. 3E and 3F depict a plan and cross-sectional view, respectively, of an example of a transparent flexible device where the top portion of the screen is folded in front of the screen.

FIGS. 3A, 3C, and 3E depict a bend line through the device 300. The bend line depicts the same bend location in FIGS. 3A-F, however, the bend is not in the same direction. Additionally, FIGS. 3A-F depict only one horizontal bend line through the flexible transparent display device, however, it is to be understood that the devices of FIGS. 3A-F may be implemented with one or more bend lines in any direction, in the flexible transparent display device. For example, the bend could be made in the corner of device, such that the bend is not parallel to a specific side. In another example, the bend could exhibit that of a scroll, such that a portion of the display is rolled on top of itself.

FIGS. 3A and 3B depict a plan and cross-sectional view, respectively, of an example of device 300 that is not bent. FIG. 3B depicts a cross-sectional view of FIG. 3A, taken perpendicular to bend line 305. In FIG. 3A, device 300 includes surface 310 and bend line 305, text 322 and image 324. In this example, text 322 and image 324 comprise the content displayed on device 300. Bend line 305 in FIG. 3A depicts the same actual bend line found in FIGS. 3C and 3E, however device 300 is not bent in FIGS. 3A and 3B. In FIG. 3B, surface 310 and surface 315 are depicted. Since device 300 is not bent in FIGS. 3A and 3B, the content (text 322 and image 324) is not rearranged and is in normal display mode.

FIGS. 3C and 3D depict a plan and cross-sectional view, respectively, of an example device 300 that is bent along bend line A-A, in accordance with an embodiment of the present invention. FIG. 3D depicts a cross-sectional view of FIG. 3C, taken perpendicular to bend line A-A. FIGS. 3C and 3D illustrate the outcome after the exemplary device of FIG. 3A and 3B are bent. Specifically, FIGS. 3C and 3D depict device 300 where the top portion of the screen above bend line A-A is folded behind display screen.

Device 300 as depicted in FIGS. 3C includes surface 310 and bend line A-A. Bend line A-A is the perceived dividing line where surface 310 is folded back. When device 300 is bent along bend line A-A, surface 310 includes surface 310 (visible portion of display) and 310' (portion of display bent behind surface 310). FIG. 3C, surface 310 is the surface which displays the content (text 322 and image 324) of device 300, and surface 310' becomes opaque.

After the device 300 is folded along bend line A-A, the content (text 322 and image 324) displayed on surface 310, shifts to accommodate the diminished surface 310 of exemplary device 300. Similarly, after device 300 is folded along bend line A-A, surface 310' becomes opaque, allowing the user easier readability of the content displayed in display.

FIGS. 3E and 3F depict a plan and cross-sectional view, respectively, of example device 300 that is bent along bend line B-B, in accordance with an embodiment of the present invention. FIG. 3F depicts a cross-sectional view of FIG. 3E, taken perpendicular to bend line B-B. FIGS. 3E and 3F illustrate the outcome after the exemplary device of FIG. 3A and B is bent. Specifically, FIGS. 3E and 3F depict device 300 where the top portion of the screen above bend line B-B is folded in front of the display screen.

Device 300 as depicted in FIG. 3E includes surface 310 and bend line B-B. Bend line B-B is the perceived dividing line where surface 310 is folded forward. When device 300 is bent along bend line B-B, surface 310 is split into two components, 310 and 310'. Below bend line B-B on FIG. 3E, the lower portion of surface 310 is the surface which displays the content (text 322 and image 324) of device 300. Above bend line B-B, the surface 310' becomes transparent. FIG. 3E portrays the surface 310 as displaying the content whereas surface 310' is transparent.

After device 300 is folded along bend line B-B, the content (text 322 and image 324) displayed on the lower portion of surface 310 shifts to accommodate the diminished display area of surface 310' of exemplary device 300. Similarly, after device 300 is folded along bend line B-B, surface 310' becomes transparent, allowing the user easier readability of all the content displayed in display 300. Additionally, in another embodiment, surface 310' may include a refraction factor allowing surface 310' to minimize any light refraction obscuring the displayed content on the lower portion of surface 310, thereby aligning the content depicted on the display of any misalignment caused by a refraction between the display itself and the covered section of the display.

In an alternative embodiment computing device 100 can determine, after bending is complete, where to place the text to produce a seamless and better viewing area of the content. For example, bend display program 124 determines, based on user benefit, which portion of the display content should be displayed following a bend, as well as adjusting the content to fit within the new effective display. Thereby, in this alternative embodiment, bend display program 124 determines which portion of the display should become opaque, and/or transparent, as well as, contain the content. Specifically, bend display program 124 may determine if the top layer should depict the content or whether the bottom layer should depict the content, in conjunction with which portion of the display should be opaque and clear, in order to produce the better view ability for a user.

Figure 4:
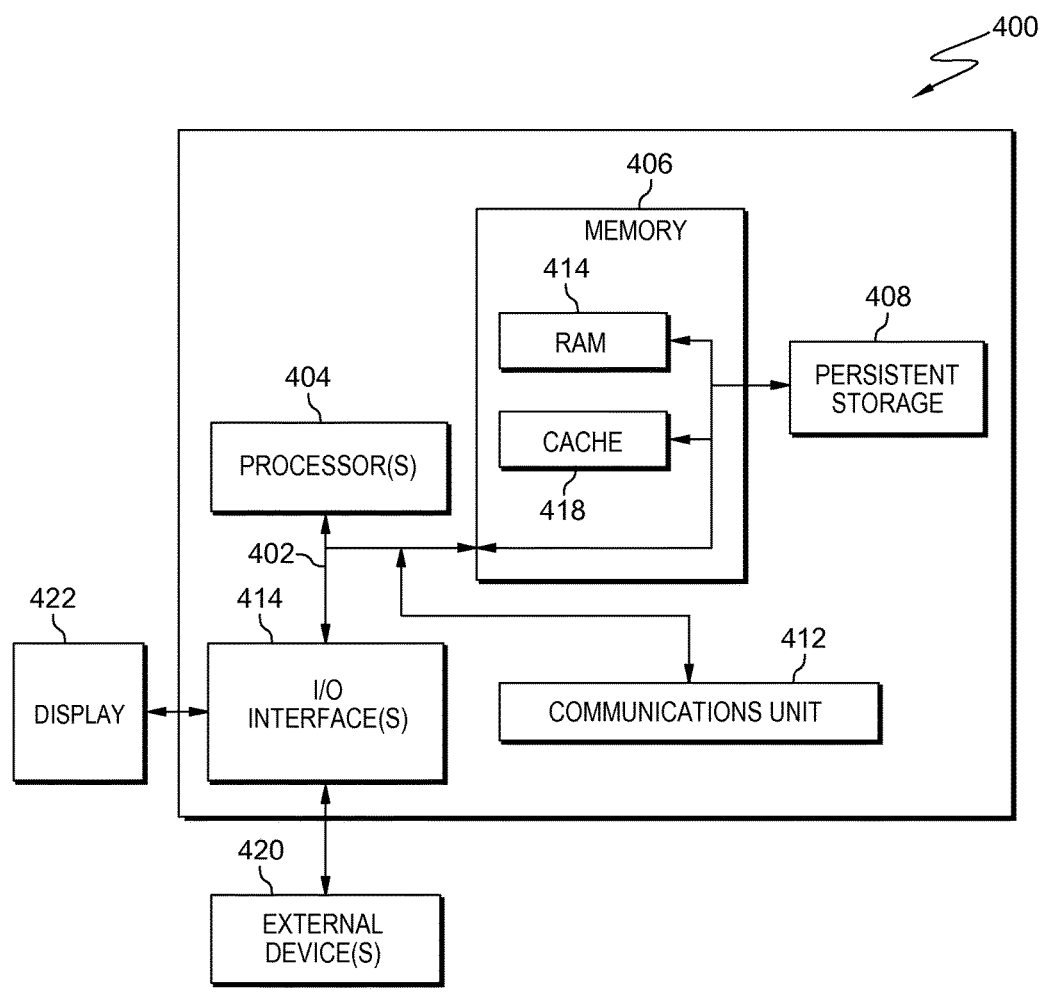
FIG. 4 depicts a block diagram of internal and external components of an electronic device, in accordance with an embodiment of the present invention.

FIG. 4 depicts a block diagram of components of a transparent flexible display device 400, in accordance with an illustrative embodiment of the present invention. It should be appreciated that FIG. 4 provides only an illustration of one implementation, and does not imply any limitations with regard to the environments in which different embodiments may be implemented. Many modifications to the depicted environment may be made.

Transparent flexible display device 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media.

Persistent storage 408 may include, for example, a plurality of magnetic hard disk drives. Programs are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Software and data used to practice embodiments of the present invention can be downloaded to transparent flexible display device 400 through communications unit 412 (i.e., via the Internet, a local area network, or other wide area network). From communications unit 412, the software and data may be loaded to persistent storage 408.

I/O interface(s) 414 allows for input and output of data with other devices that may be connected to transparent flexible display device 400. For example, I/O interface 414 may provide a connection to external devices 420, such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., the bend display program 124 in computing device 100, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for adjusting content on a display device, the method comprising:
   providing a display, wherein the display is flexible and transparent, and wherein the display includes content;
   receiving, by one or more processors, a first set of data associated with one or more bends in the display, wherein the first set of data includes information on a direction of the one or more bends and a bending line of the one or more bends in the display;
   determining, by one or more processors, based on the direction of the one or more bends, whether a first portion of the display obscures the content on the display;
   responsive to determining the first portion of the display obscures the content on the display, minimizing, by one or more processors, light refraction of the first portion of the display by:
      determining a relative refraction factor of the first portion of the display, wherein the first portion of the display is transparent, and
      applying the determined relative refraction factor to the first portion of the display to remove light refraction obscuring the content;
   in response to receiving the first set of data associated with the one or more bends in the display, calculating, by the one or more processors, a first effective display; and
   adjusting, by one or more processors, the content to fit the first effective display based on the bending line.

2. The method of claim 1, wherein the first set of data associated with the one or more bends in the display comprises: a location of the one or more bends and a radius of the one or more bends.

3. The method of claim 1, wherein calculating the first effective display comprises:
   determining, by the one or more processors, the first portion of the display and a second portion of the display.

4. The method of claim 1, further comprising:
   receiving, by the one or more processors, a modified set of data associated with the one or more bends in the display, wherein the modified set of data derives from the first set of data; and
   in response to receiving the modified set of data associated with the one or more bends in the display, calculating, by one or more processors, a second effective display, based on modifying the first effective display.

5. The method of claim 1, further comprising:
   responsive to determining the first portion of the display does not obscure the content on the display, displaying the content on the first portion of the display, wherein a second portion of the display is opaque.

6. The method of claim 1, wherein adjusting the content to fit the first effective display comprises at least one of:
   reducing a size of the content on the display, realigning the content on the display, altering the content on the display, and manipulating the content on the display.

7. A computer program product for adjusting content on a display device, the computer program product comprising:
   a computer readable storage medium and program instructions stored on the computer readable storage medium, the program instructions comprising:
   program instructions to provide a display, wherein the display is flexible and transparent, and wherein the display includes content;
   program instructions to receive a first set of data associated with one or more bends in the display, wherein the first set of data includes information on a direction of the one or more bends and a bending line of the one or more bends in the display;
   program instructions to determine, based on the direction of the one or more bends, whether a first portion of the display obscures the content on the display;

responsive to determining the first portion of the display obscures the content on the display, program instructions to minimize light refraction of the first portion of the display by:
- determining a relative refraction factor of the first portion of the display, wherein the first portion of the display is transparent, and
- applying the determined relative refraction factor to the first portion of the display to remove light refraction obscuring the content;

in response to receiving the first set of data associated with the one or more bends in the display, program instructions to calculate a first effective display; and program instructions to adjust the content to fit the first effective display based on the bending line.

8. The computer program product of claim 7, wherein the first set of data associated with the one or more bends in the display comprises: a location of the one or more bends, and a radius of the one or more bends.

9. The computer program product of claim 7, wherein program instructions to calculate the first effective display comprise:
- program instructions to determine the first portion of the display and a second portion of the display.

10. The computer program product of claim 7, further comprising:
- program instructions to receive a modified set of data associated with the one or more bends in the display, wherein the modified set of data derives from the first set of data; and
- in response to receiving the modified set of data associated with the one or more bends in the display, program instructions to calculate a second effective display, based on modifying the first effective display.

11. The computer program product of claim 7, further comprising:
- responsive to determining the first portion of the display does not obscure the content on the display, program instructions to display the content on the first portion of the display, wherein a second portion of the display is opaque.

12. The computer program product of claim 7, wherein program instructions to adjust the content to fit the first effective display comprise at least one of:
- program instructions to reduce a size of the content on the display;
- program instructions to realign the content on the display;
- program instructions to alter the content on the display; and
- program instructions to manipulate the content on the display.

13. A computer system for adjusting content on a display device, the computer system comprising:
- one or more computer processors;
- one or more computer readable storage media;
- program instructions stored on the one or more computer readable storage media for execution by at least one of the one or more processors, the program instructions comprising:
  - program instructions to provide a display, wherein the display is flexible and transparent, and wherein the display includes content;
  - program instructions to receive a first set of data associated with one or more bends in the display, wherein the first set of data includes information on a direction of the one or more bends and a bending line of the one or more bends in the display;
  - program instructions to determine, based on the direction of the one or more bends, whether a first portion of the display obscures the content on the display;
  - responsive to determining the first portion of the display obscures the content on the display, program instructions to minimize light refraction of the first portion of the display by:
    - determining a relative refraction factor of the first portion of the display, wherein the first portion of the display is transparent, and
    - applying the determined relative refraction factor to the first portion of the display to remove light refraction obscuring the content;
  - in response to receiving the first set of data associated with the one or more bends in the display, program instructions to calculate a first effective display; and
  - program instructions to adjust the content to fit the first effective display based on the bending line.

14. The computer system of claim 13, wherein the first set of data associated with the one or more bends in the display comprises: a location of the one or more bends, and a radius of the one or more bends.

15. The computer system of claim 13, wherein program instructions to calculate the first effective display comprise:
- program instructions to determine the first portion of the display and a second portion of the display.

16. The computer system of claim 13, further comprising:
- program instructions to receive a modified set of data associated with the one or more bends in the display, wherein the modified set of data derives from the first set of data; and
- in response to receiving the modified set of data associated with the one or more bends in the display, program instructions to calculate a second effective display, based on modifying the first effective display.

17. The computer system of claim 13, further comprising:
- responsive to determining the first portion of the display does not obscure the content on the display, program instructions to display the content on the first portion of the display, wherein a second portion of the display is opaque.

18. The computer system of claim 13, wherein program instructions to adjust the content to fit the first effective display comprise at least one of:
- program instructions to reduce a size of the content on the display;
- program instructions to realign the content on the display;
- program instructions to alter the content on the display; and
- program instructions to manipulate the content on the display.

* * * * *